United States Patent [19]

Hayashi et al.

[11] Patent Number: 4,692,109
[45] Date of Patent: Sep. 8, 1987

[54] APPARATUS FOR CUTTING FILLED CYLINDRICAL DOUGH BODY

[75] Inventors: Torahiko Hayashi; Yasunori Tashiro, both of Utsunomiya, Japan

[73] Assignee: Rheon Automatic Machinery Co., Ltd., Japan

[21] Appl. No.: 787,619

[22] Filed: Oct. 15, 1985

[30] Foreign Application Priority Data

Oct. 13, 1984 [JP] Japan ................... 59-215006

[51] Int. Cl.$^4$ ............................. A21C 11/12
[52] U.S. Cl. ................... 425/308; 83/321; 83/338; 425/315; 425/316; 425/456; 426/503
[58] Field of Search ............... 425/289, 296, 306, 308, 425/313, 315, 456, 316, 424, 425, 432; 83/338, 321; 426/496, 502, 503, 516, 518

[56] References Cited

U.S. PATENT DOCUMENTS

| 459,115 | 9/1891 | Allison | 83/338 X |
| 2,051,453 | 8/1936 | Mactaggart et al. | 83/338 |
| 2,802,431 | 8/1957 | Hoagland et al. | 83/321 X |
| 3,089,372 | 5/1963 | Pilliner | 83/338 X |
| 3,795,163 | 3/1974 | Armstrong et al. | 83/338 X |
| 4,047,865 | 9/1977 | Axer et al. | 425/315 X |
| 4,424,236 | 1/1984 | Campbell | 426/503 X |
| 4,562,084 | 12/1985 | McKee | 426/503 X |

FOREIGN PATENT DOCUMENTS 44-1169 1/1969 Japan .

Primary Examiner—Richard L. Chiesa
Attorney, Agent, or Firm—Guy W. Shoup

[57] ABSTRACT

An apparatus for continuously cutting a filled cylindrical dough body is provided. The apparatus comprises a conveyor belt and at least one cutter arranged above and perpendicularly to the conveyance path of the conveyor belt. The cutter has a wedge-form blade which penetrates the cylindrical dough body from above, while the dough body is being conveyed, by the combination of a downward movement and repeated lateral movements, whereby the dough is cut into separate filled dough pieces without exposing the filler.

4 Claims, 4 Drawing Figures

APPARATUS FOR CUTTING FILLED CYLINDRICAL DOUGH BODY

BACKGROUND OF THE INVENTION

1. FIELD OF THE INVENTION

The present invention relates to an apparatus for cutting a filled cylindrical dough body, and particularly to an apparatus for cutting a filled cylindrical dough body for producing filled bread, filled Chinese buns, and other food products, without exposing the filler.

2. DESCRIPTION OF PRIOR ART

In the past, production of filled dough products from a filled cylindrical dough body has generally been carried out by cutting the dough body conveyed on a conveyor with a knife or a piano wire mounted on the conveyor. This method tends to expose the filler and cause the dough to adhere to the blade of a cutter, and it has no function to incrust the dough, so that a separate incrusting operation is required.

Japenese Patent Publication No. 1169/69 discloses a confectionery molder where vertically oppositely positioned toothed plates, each having two converging faces to form a tooth, cut a bar-shaped filled dough body conveyed on a conveyor belt, and then the upper toothed plates sway laterally to roll divided dough pieces in a space surrounded by adjacent teeth to form spherical filler-containing dough pieces. Although this apparatus can make ball-shaped filled dough pieces, it requires a complex mechanism and the filler is liable to be exposed when the toothed plates cut the dough body.

In this invention, a cutter with a wedge-form blade cuts a filled cylindrical dough body while it is being conveyed, by the combination of a downward movement and repeated lateral movements and across the surface of the fed cylindrical dough body, so that perfectly incrusted filled dough pieces can be produced without exposing the filler. The cutting operation may be facilitated by a vibrating member and an elastic member underneath a conveyor belt.

SUMMARY OF THE INVENTION

An object of the present invention is to provide an apparatus for cutting a filled cylindrical dough body to produce filled dough pieces.

Another object of the present invention is to provide an apparatus for cutting a filled cylindrical dough body to obtain perfectly incrusted separate dough pieces.

A further object of the present invention is to provide an apparatus for continuously separating the filled cylindrical dough body, while the dough is continuously conveyed on a conveyor belt, to obtain separate filled dough pieces without exposing the filler.

In one aspect of the invention, an apparatus for cutting a filled cylindrical dough body is provided, which comprises a conveyor belt and at least one cutter member, arranged above and perpendicularly to the conveyance path of the conveyor belt and provided with a blade, said blade being arranged to progress in synchronization with the conveyor belt, while being lowered to come into contact with the dough and then raised, and while it repeatedly moves from side to side perpendicularly to the conveyance path.

The apparatus of the present invention comprises a conveyor belt to convey a filled cylindrical dough body. Any type of conveyor belt may be used so long as the upper surface is flat and preferably horizontal. At least one cutter having a blade is arranged above and perpendicularly to the conveyance path of the conveyor belt.

The cutter may consist of a plate having blades on both ends and may be supported by a shaft. The cutter rotates with the shaft so that when the blades move near the conveyor belt they travel in the same direction. The blade is preferably in the form of a wedge. The steam of the blade should be sufficiently thick to provide a wedge. The blade is adapted to move downwardly to cut the dough body, while carrying out repeated lateral movements. It is further arranged to progress in the direction of movement of the conveyor belt at the same speed in the area where the dough is cut.

The apparatus further comprises a vibrating member and an elastic member disposed underneath the conveyor belt. The elastic member may be disposed between the conveyor belt and the vibrating member or may constitute a portion of the vibrating member. The vibrating member is driven by any suitable means and vibrates the conveyor belt in any suitable direction to facilitate the cutting operation. The lateral movements of the blades cause the filled cylindrical dough body to form a narrowed portion, where the filler is already removed forwardly and rearwardly of the conveying direction of the dough and there is only an outer material. When the blade comes to the bottom of its motion, it cuts the dough body at the portion where only the outer material is present. The cutting operation is assisted by the elastic member. The elastic member can be made of any material suitable for absorbing the force applied by the cutter, such as plastics and soft wood. It enables the cutter to readily separate a cut dough piece from the remaining cylindrical dough body.

DESCRIPTION OF THE PREFERRED EMBODIMENT

The apparatus of the present invention will now be described with reference to the drawings.

Figure 1A:
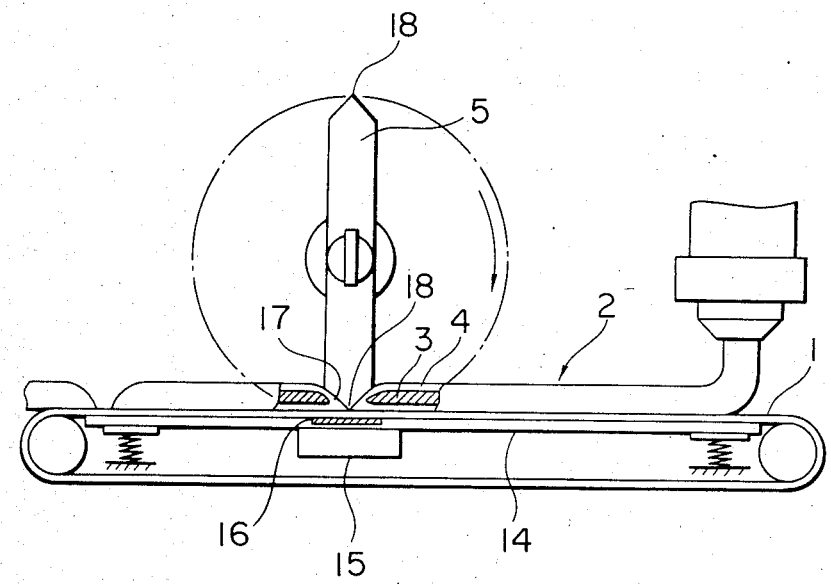
FIG. 1(A) is a side elevation view of an embodiment of the present invention.
Figure 1B:
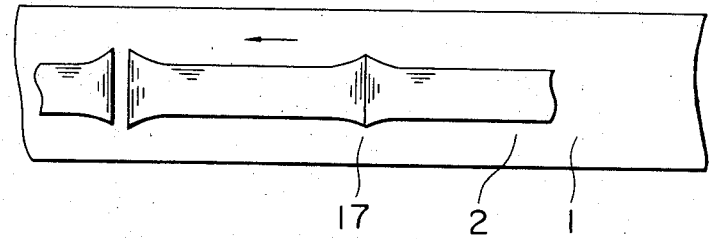
FIG. 1(B) is a plan view of a filled cylindrical dough body which is cut and separated on a conveyor belt.

In FIG. 1(A), a rectangular plate-shaped cutter 5 is disposed above and perpendicularly to the conveyance path of a conveyor belt 1. The cutter 5 has two blades 18 at opposite ends, which are wedge-form.

Figure 2:
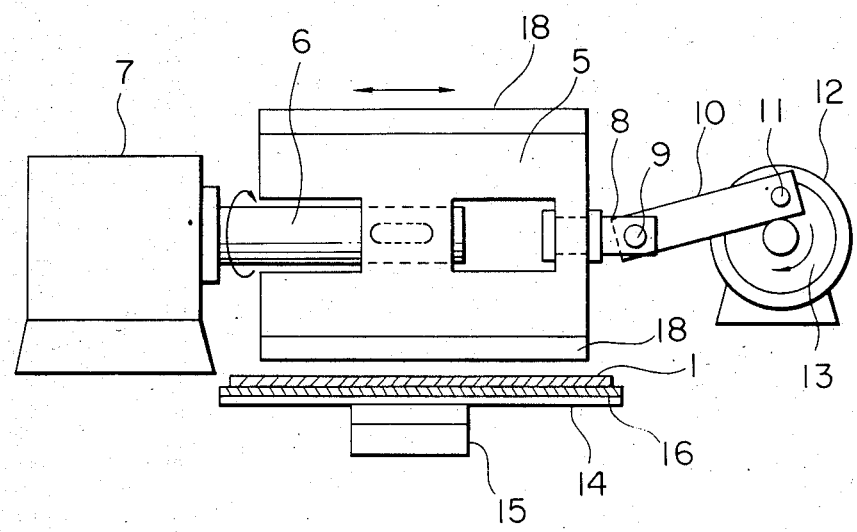
FIG. 2 is a front elevation view partially showing an embodiment of the present invention.

In FIG. 2, the rectangular cutter 5 is axially slidably mounted on the shaft 6, which is in turn connected to a motor 7 near an end of the cutter 5 and is driven by the motor 7 in synchronization with the movement of the conveyor belt 1. At the other end of the cutter 5, an end of a rod 8 is coaxially and slidably mounted on the shaft 6.

The other end of the rod 8 is rotatably connected by means of a pin 9 to an end of a crank arm 10. The other end of the crank arm 10 is also rotatably connected by means of a pin 11 to a point near the circumference of a disc 13, which can be rotated by a motor 12. Therefore, when the motor 12 rotates, the crank arm 10 causes the cutter 5 to move reciprocally along the shaft 6. As the cutter 5 rotates while reciprocally moving along the shaft 6, the blade 18 descends following an arcuate path while making a lateral zigzag movement. A vibrating member 14 is disposed underneath the conveyor belt 1 to vibrate the fed dough through the belt 1 and is operated by an oscillator 15 positioned underneath the cutter 5 and under the vibrating member 14. An elastic member 16 is disposed between the belt 1 and the vibrating member 14, at the area where the blade is in contact with the dough as shown in FIG. 1(A). The elastic member 16 may also be arranged to form a portion of the vibrating member 14.

When the filled cylindrical dough body 2 is fed on the conveyor belt 1, the blade 18 progresses by the rotation of the cutter 5 dirven by the motor 7 in synchronization with the conveyor belt 1 to come into contact with the cylindrical dough body, while the blade repeatedly moves perpendicularly to the fed cylindrical dough body. This repeated lateral movement of the blade 18 is, as aforementioned, carried out by the crank arm 10 operated by the motor 12. The downward movement of the blade 18 along an arcuate path is carried out in such a manner that it moves without chaning the positional relationship with the portion of the dough that is cut by the blade 18.

The repeated lateral movement of the blade 18 causes it to slide on the surface of the dough on each side of the blade. The elastic and viscous properties of the dough cause it to tend to mvoe i the same direction as that of the movement of the blade, with the result that the dough is induced to cover the filler at the area 17 where the cylindrical dough body is cut. Also, the reciprocal lateral movement of the cutter 5 prevents the dough from sticking to the surfaces of the blade 18. If the cutter 5 were to cut the dough without the reciprocal movement, the dough would adhere to the blade, so that, when the blade 18 is separated from the cut dough piece, the adhesion of the dough to the blade may cause to spill the filler.

Furthermore, during the time the blade 18 is in contact with the dough, the dough 2 is vibrated by the vibrating member 14, so that the action of the blade 18 to have the dough to cover the filler is enhanced.

When the blade 18 arrives at its lowest position where the edge of the blade 18 touchs the belt 1, the constricted dough portion is cut and separated into filled cylindrical dough pieces of which the filler 3 is perfectly incrusted by the outer material 4.

The elastic member 16 promotes the smooth cutting of the dough, since it permits the blade 18 to push the belt 1 downwardly and make a tight contact with it, thereby ensuring the separation is cut dough pieces from the remainder.

Figure 3:
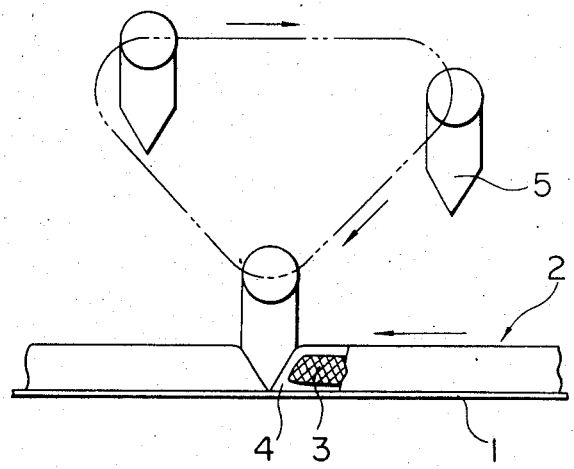
FIG. 3 is a schematic view illustrating another embodiment of the present invention.

If in place of the elastic member 16 a rigid member is employed, highly elastic dough such as bread dough might not be completely separated because the edge of the blade only touches the surface of the belt 1. By changing the number of blades, filled dough pieces of a desired length can be produced. Furthermore, the cutter may take a different form and move along a path of a different locus. According to an embodiment, a plurality of cutters 5 hung from a chain carrier arranged to move along a triangular path, as shown in FIG. 3, can also be used without deviating from the technical scope of the invention.

We claim:

1. An apparatus for cutting a filled cylindrical dough body into pieces without exposing the filler, comprising a conveyor belt and at least one cutter member, arranged above and perpendicularly to the conveyance path of the conveyor belt and provided with a blade having means including a wedge shape of sufficient width for closing the dough over the filler when the blade cuts through the dough body, means for moving said blade to progress in synchronization with the conveyor belt as the blade cuts through the dough body and for lowering the blade into cutting contact with the dough body and then raising it, and means for repeatedly reciprocating it from side to side perpendicularly to the conveyance path as it is lowered.

2. An apparatus of claim 1, further comprising a vibrating member disposed underneath the conveyor belt to vibrate the dough at the area where the blade is in contact with the dough.

3. An apparatus of claim 2, further comprising an elastic member provided between the conveyor belt and the vibrating member and at the area where the blade is in contact with the dough.

4. An apparatus of claim 2, further comprising an elastic member provided to constitute the upper portion of the vibrating member where it comes into contact with the blade.

* * * * *